United States Patent
Cho et al.

(10) Patent No.: US 11,367,865 B2
(45) Date of Patent: Jun. 21, 2022

(54) METHOD OF MANUFACTURING COMPOSITE ANODE MATERIAL AND COMPOSITE ANODE MATERIAL FOR LITHIUM SECONDARY BATTERY

(71) Applicant: HPK INC., Pyeongtaek-si (KR)

(72) Inventors: Chang Hyun Cho, Suwon-si (KR);
Chang Se Woo, Hwaseong-si (KR);
Kap Seung Yang, Gwangju (KR);
Chang Ha Lim, Seongnam-si (KR);
Chung Hyung Joh, Yangsan-si (KR)

(73) Assignee: HPK INC., Pyeongtaek-si (KR)

( * ) Notice: Subject to any disclaimer, the term of this patent is extended or adjusted under 35 U.S.C. 154(b) by 0 days.

(21) Appl. No.: 16/686,461

(22) Filed: Nov. 18, 2019

(65) Prior Publication Data
US 2020/0321607 A1    Oct. 8, 2020

(30) Foreign Application Priority Data

Apr. 5, 2019 (KR) .................. 10-2019-0040028

(51) Int. Cl.
*H01M 4/1393* (2010.01)
*H01M 4/04* (2006.01)
(Continued)

(52) U.S. Cl.
CPC ....... *H01M 4/1393* (2013.01); *H01M 4/0471* (2013.01); *H01M 4/1395* (2013.01); *H01M 10/0525* (2013.01)

(58) Field of Classification Search
CPC ......... H01M 4/1393–1395; H01M 4/04–0471; H01M 10/0525
See application file for complete search history.

(56) References Cited

U.S. PATENT DOCUMENTS

| | | | |
|---|---|---|---|
| 2015/0287613 A1 | 10/2015 | Tadjer et al. | |
| 2020/0313162 A1* | 10/2020 | Zhamu | H01M 4/1393 |
| 2020/0354222 A1* | 11/2020 | Kim | H01M 4/625 |

FOREIGN PATENT DOCUMENTS

| | | |
|---|---|---|
| CN | 109994704 A | 7/2019 |
| JP | 9-157022 A | 6/1997 |

(Continued)

OTHER PUBLICATIONS

Yonggang Yao et al., "Carbothermal shock synthesis of high-entropy-alloy nanoparticles", Science, 2018, vol. 359, pp. 1489-1494. (Year: 2018).*

(Continued)

*Primary Examiner* — Karie O'Neill Apicella
(74) *Attorney, Agent, or Firm* — Sughrue Mion, PLLC

(57) ABSTRACT

Disclosed is a method of manufacturing a composite anode material for a lithium secondary battery containing nano-sized silicon and a carbonaceous material through a single process, the method including mixing a carbonaceous material and solid silicon and performing carbothermal shock for rapidly heating the carbonaceous material so that the solid silicon is melted using the heated carbonaceous material and is dispersed and attached in the form of particles to the surface of the carbonaceous material, the size of the silicon particles, which grow on the surface of the carbonaceous material, being adjusted during the carbothermal shock. Accordingly, processing costs can be lower than conventional methods of manufacturing silicon nanoparticles, and (Continued)

manufacturing costs can be further reduced by simultaneously performing formation of the silicon nanoparticles and compounding with the carbonaceous material.

7 Claims, 14 Drawing Sheets

(51) Int. Cl.
*H01M 4/1395* (2010.01)
*H01M 10/0525* (2010.01)

(56) References Cited

FOREIGN PATENT DOCUMENTS

| JP | 2004-99674 | A | | 4/2004 | |
|----|----|----|----|----|----|
| JP | 2013-187097 | A | | 9/2013 | |
| JP | 2015-503185 | A | | 1/2015 | |
| KR | 10-2014-0062584 | A | | 5/2014 | |
| KR | 10-2014-0096581 | A | | 8/2014 | |
| KR | 10-2014-0136321 | A | | 11/2014 | |
| KR | 20140136321 | A | * | 11/2014 | ............ H01M 4/00 |
| KR | 10-1500994 | B1 | | 3/2015 | |
| KR | 10-1875950 | B1 | | 7/2018 | |
| WO | 2019/126196 | A1 | | 6/2019 | |

OTHER PUBLICATIONS

The Extended European Search Report dated Sep. 1, 2020, issued by the European Patent Office in application No. 20156837.5.
Database WRI Week 201501 Thomson Scientific, London, GB; AN 2014-V99398 XP002800114, -& KR 2014 0136321 A (Korea Electrotechnology Res Inst) Nov. 28, 2014, 2 pages total.
Yonggang Yao et al., "Carbothermal shock synthesis of high-entropy-alloy nanoparticles", Science, 2018, vol. 359, pp. 1489-1494 (123 pages).
Sara E. Skrabalak, "Mashing up metals with carbothermal shock", Science, Mar. 30, 2018, vol. 359, Issue 6383, p. 1467 (2 pages total).
Communication dated Mar. 12, 2020, issued by the Korean Patent Office in counterpart Korean Application No. 10-2019-0131584.
Maroni et al., "Graphene/silicon nanocomposite anode with enhanced electrochemical stability for lithium-ion battery applications", Journal of Power Sources, vol. 269, 2014, pp. 873-882.
Communication dated Jan. 5, 2021, issued by the Japanese Patent Office in counterpart Japanese Application No. 2019-209881.
Communication dated Jun. 8, 2021, issued by the Japanese Patent Office in counterpart Japanese Application No. 2019-209881.

* cited by examiner

METHOD OF MANUFACTURING COMPOSITE ANODE MATERIAL AND COMPOSITE ANODE MATERIAL FOR LITHIUM SECONDARY BATTERY

CROSS-REFERENCE TO RELATED APPLICATION

This application claims the priority benefit of Korean Patent Application No. 10-2019-0040028, filed on Apr. 5, 2019 and Korean Patent Application No. 10-2019-0131584, filed on Oct. 22, 2019 in the Korean Intellectual Property Office, the disclosure of which is incorporated herein by reference.

BACKGROUND OF THE INVENTION

1. Technical Field

The present invention relates to a method of manufacturing an active material for a lithium secondary battery using silicon, and more particularly to a method of manufacturing a composite anode material, in which nano-sized silicon and a carbonaceous material are compounded.

2. Description of the Related Art

Recently, there has been greatly increased demand for lithium secondary batteries as a power source for personal portable terminal devices, such as mobile phones, smartphones and tablet PCs, and electric vehicles, such as hybrid electric vehicles and plug-in electric vehicles. In particular, active materials enabling rapid charging and high power output and having high energy density, which may replace the anode and cathode materials for existing commercially available lithium secondary batteries, are being actively developed.

In the case of an anode, the theoretical capacity of graphite, used in most commercially available lithium secondary batteries, is about 372 mAh/g, and the interlayer diffusion rate of lithium is low, making it difficult to realize rapid charging and discharging. As an active material to overcome this problem, a silicon-based composite anode material using silicon having a theoretical capacity of 4200 mAh/g has been receiving much attention for the past 20 years. Particularly, in the case of a silicon-graphite composite anode material, competitive development for commercialization is ongoing in related industries. Despite the high energy density and improved charge/discharge life characteristics thereof, the silicon-graphite composite anode material is limitedly able to compete with existing graphite in view of manufacturing costs.

Meanwhile, like most metal materials that are electrochemically alloyed with lithium, silicon is problematic because of mechanical damage to electrodes caused by volume expansion and contraction due to charging and discharging and a remarkably shortened life resulting therefrom, and thus, in order to solve these problems, many attempts are made to improve the performance of silicon through the production of silicon nanoparticles and compounding with different materials that are reactive or non-reactive with lithium (Korean Patent No. 10-1875950).

However, the silicon nanoparticles are very expensive due to the manufacturing cost thereof. Although technologies to lower the cost of manufacturing silicon nanoparticles have been developed, the manufacturing process includes two steps in which silicon nanoparticles are manufactured and then compounded, making it difficult to manufacture silicon-based composite anode materials at low cost (Korean Patent No. 10-1500994).

SUMMARY OF THE INVENTION

Accordingly, the present invention has been made keeping in mind the problems encountered in the related art, and an objective of the present invention is to provide a method of manufacturing a composite anode material, in which nano-sized silicon and a carbonaceous material are compounded, through one step process.

In order to accomplish the above objective, an aspect of the present invention provides a method of manufacturing a composite anode material containing nano-sized silicon particles dispersed therein, the method including a preparation step of mixing a carbonaceous material and solid silicon as raw materials and a carbothermal shock step of rapidly heating the carbonaceous material to 1400° C. or higher within 10 sec so that the solid silicon is melted using the heated carbonaceous material and is dispersed and attached in the form of particles to the surface of the carbonaceous material, in which the size of the silicon particles, which are attached to the surface of the carbonaceous material and grow, is adjusted in the carbothermal shock step.

As used therein, the term "carbothermal shock" means that rapid heating of a carbon material is induced by applying electric power or applying microwaves or high-frequency waves in the state in which the carbon material and solid silicon are mixed, whereby the solid silicon mixed with the carbon material is melted and spheroidized and is dispersed and attached to the surface of the carbon material. Here, the size of the attached silicon particles may be adjusted to the range from tens to hundreds of nanometers. Specifically, when the carbonaceous material is quickly heated to 1400° C. or higher for 10 sec or less, the solid silicon is melted therewith and is attached to the surface of the carbonaceous material.

In particular, even when the size of the solid silicon mixed with the carbon material falls in the range of tens of micrometers, the silicon may be attached, so long as it is able to melt due to carbothermal shock, and thus silicon particles having a size ranging from tens to hundreds of nanometers may be attached to the surface of the carbon material using a silicon material on a micrometer scale.

During the preparation of the carbonaceous material, a stabilization step of maintaining the shape thereof at a high temperature and a carbonization step of imparting a predetermined electrical conductivity thereto may be performed.

Here, the carbonaceous material may be at least one selected from among natural graphite, artificial graphite, exfoliated graphite, graphene oxide, carbon nanotubes, and a carbon fiber. In particular, flake graphite or graphene oxide may be applied, and a carbon fiber having a micrometer size or a nanometer size may be applied.

Specifically, when the carbonaceous material is graphite, the preparation step may include mixing graphite and silicon particles in a powder phase, or may further include a pressing process after the mixing.

Alternatively, when the carbonaceous material is an exfoliated graphite sheet, the preparation step may include dip-coating the exfoliated graphite sheet with a liquid containing silicon particles dispersed therein, and when the carbonaceous material is a carbon fiber, the preparation step may include dip-coating the carbon fiber with a liquid containing silicon particles dispersed therein.

It is preferred that the carbothermal shock step be controlled such that the diameter of the silicon particles attached to the surface of the carbonaceous material is 100 nm or less.

After the carbothermal shock step, a cooling step may be performed so as to prevent the silicon particles attached to the surface of the carbonaceous material from growing due to the thermal energy remaining in the carbonaceous material.

After the carbothermal shock step, the composite may be pulverized, coated with a carbon precursor and manufactured into a spherical shape having a diameter of 15 to 20 µm.

Another aspect of the present invention provides a composite anode material for a secondary battery, the composite anode material including a carbonaceous material and silicon particles dispersed and attached to the surface of the carbonaceous material, in which the silicon particles may be formed through carbothermal shock that enables the carbonaceous material to be rapidly heated so that silicon is melted and is dispersed and attached to the surface of the carbonaceous material.

Here, the carbonaceous material may be at least one selected from among natural graphite, artificial graphite, exfoliated graphite, graphene oxide, carbon nanotubes, and a carbon fiber. In to particular, flake graphite or graphene oxide may be applied, and a carbon fiber having a micrometer size or a nanometer size may be applied.

According to the present invention, processing costs can be reduced compared to conventional methods of manufacturing silicon nanoparticles, and moreover, manufacturing costs can be further reduced by simultaneously carrying out formation of the silicon nanoparticles and compounding thereof with the carbonaceous material.

In addition, the composite anode material according to the present invention is capable of solving the durability problem attributable to changes in volume during charge and discharge of Li ions by dispersing and attaching nano-sized silicon particles to the surface of and inside the carbonaceous material, and the small size of the silicon particles and the close contact between the silicon particles and the carbon material make it possible to lower the resistance at the interface therebetween, thereby realizing rapid charging.

DESCRIPTION OF SPECIFIC EMBODIMENTS

Figure 1:
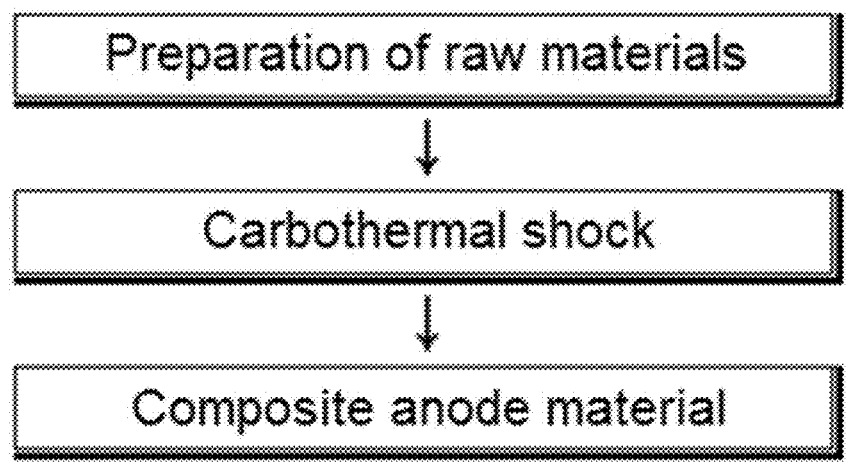
FIG. 1 is a flowchart showing a process of manufacturing a composite anode material according to an embodiment of the present invention.

Embodiments according to the present invention will be described in detail with reference to the accompanying drawings.

However, embodiments of the present invention may be modified in a variety of different forms, and the scope of the present invention is not limited to the embodiments described below. The shapes and sizes of the elements in the drawings may be exaggerated for clarity, and elements denoted by the same reference numerals in the drawings are the same elements.

In the specification, when a part is "connected" to another part, this includes not only a case in which these parts are "directly connected", but also a case in which these parts are "electrically connected" with a further part being interposed therebetween. It will be further understood that when a part "comprises", "includes", or "has" an element, this means that other elements are not excluded but may be further included, unless otherwise stated.

Also, the terms such as "first", "second", etc. may be used to distinguish one element from another element, and the scope of the present invention must not be limited by these terms. For instance, a "first" element discussed below could be termed a "second" element. Similarly, the "second" element could also be termed a "first" element.

FIG. 1 is a flowchart showing the process of manufacturing a composite anode material according to the present invention.

Specifically, a carbonaceous material and silicon are prepared as raw materials for manufacturing the composite anode material.

Any type of carbonaceous material may be used together with silicon to form a composite anode material, and the carbonaceous material may be an activated carbonaceous material having pores formed in the surface thereof. Specifically, natural graphite and artificial graphite materials are preferably applied, and exfoliated graphite, flake graphite, graphene oxide, or the like may also be applied. Furthermore, the carbonaceous material may be carbon nanotubes, or may be carbon fiber having a micrometer size or a nanometer size.

Silicon may be in the form of particles. Here, even when silicon particles are used as the raw material of the present invention, it is not essential to use nano-sized particles. Since silicon particles on a micro-scale may be used, the material cost is not high.

The mixture of carbonaceous material and silicon, which are the raw materials, is prepared. Here, the mixture is preferably prepared by uniformly dispersing two kinds of raw materials. Even when it is difficult to disperse silicon particles, silicon may be dispersed in an additional dispersion medium and may then be mixed with the carbonaceous material. Moreover, the carbonaceous material and silicon may be mixed in the state of being physically separated, and also, a structure in which silicon particles are dispersed in carbon fiber as the carbonaceous material may be applied.

The method of manufacturing the composite anode material according to the present invention is performed through carbothermal shock that enables the carbonaceous material to be rapidly heated in a short time so that the silicon mixed with the carbonaceous material is melted using heat thus generated and is attached to the surface of the carbonaceous material. As such, even when silicon mixed with the carbonaceous material has a size in the range of tens of micrometers, the silicon, which is melted and attached to the surface of the carbonaceous material, gradually grows from the nano size, and thus the size thereof may be adjusted to the range of tens to hundreds of nanometers.

Rapid heating of the carbonaceous material may be accomplished by applying high current or by applying microwaves or high-frequency waves. In this embodiment, the carbonaceous material is rapidly heated by applying electric power. To this end, two electrodes for applying electric power are spaced apart from each other at a predetermined interval, and the raw materials are disposed in the state of being dispersed between the electrodes. Next, electric power is applied between the electrodes to allow electric power to flow through the dispersed carbonaceous material. In order to facilitate contact between the raw materials and the electrodes, it is preferable to control the interval between the electrodes and pressure using a servo motor on a sample-mounting stage, and also, a cooling system may be provided in order to prevent the attached silicon from excessively growing.

Here, when the current is allowed to flow to the carbonaceous material located between the electrodes by adjusting the current, voltage, and pulse frequency of the applied electric power, the carbonaceous material is heated to a high temperature, whereby a carbothermal shock is applied. As such, the carbothermal shock may be controlled by adjusting the applied current, and the temperature is adjusted to 1400° C. or higher, at which the silicon material is melted within 10 sec, and the time required to maintain the carbothermal shock is additionally controlled.

Of the raw materials, the carbonaceous material is heated by the current applied thereto to thus supply thermal energy to silicon so that the silicon is melted, and functions as a frame for attachment of silicon because silicon is primarily attached to the surface of the carbonaceous material. In particular, silicon is mainly attached to the pores in the surface of the carbonaceous material.

Since the carbothermal shock is controlled depending on the conditions and time for application of electric power, the amount and size of silicon (hereinafter referred to as "silicon particles") attached to the surface of the carbonaceous material are determined, and the diameter of silicon that is attached may be adjusted to 100 nm or less so as to enable rapid charging and discharging. Although the lower limit of the size of the silicon particles is not particularly limited, it is preferably set to 50 nm or more so as to maintain the crystallinity of silicon.

Meanwhile, in order to prevent the size of the silicon from increasing due to the remaining heat, a cooling step may be further performed after current application.

Processing the composite anode material, which is manufactured as above and in which silicon is attached to the carbonaceous material, in a form suitable for electrode fabrication may be further performed. This processing may be carried out during the electrode fabrication, or may be additionally performed in the course of manufacturing an anode material.

Figure 2:
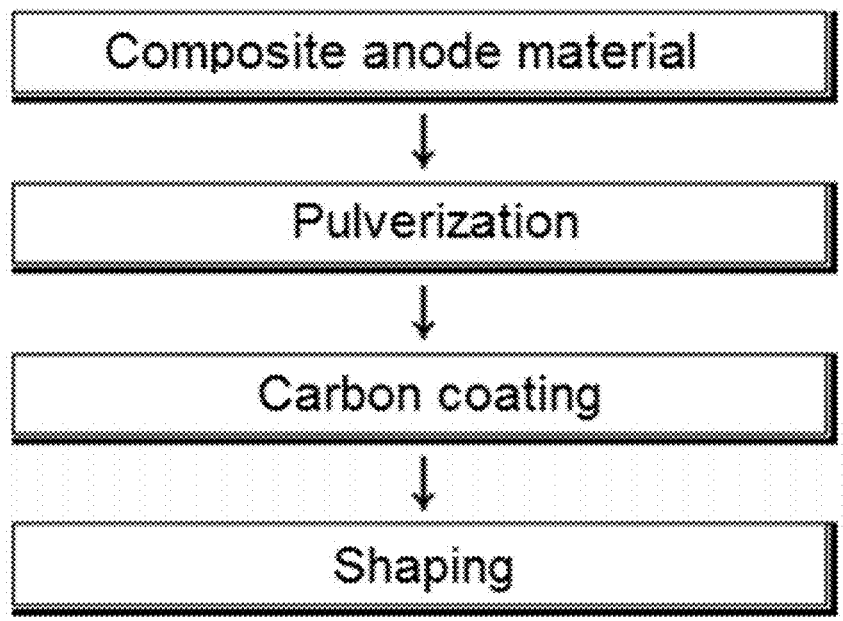
FIG. 2 is a flowchart showing additional processing of the composite anode material according to the present invention.

FIG. 2 is a flowchart showing additional processing of the composite anode material according to the present embodiment.

As shown in FIG. 2, the composite anode material, configured such that silicon nanoparticles are attached to the carbonaceous material, is pulverized to thus enlarge the surface area thereof, coated with a carbon material, and granulated into a spherical shape, the diameter of which may fall in the range of 15 to 20 μm.

Below, the specific shape of the composite anode material manufactured according to the present invention is confirmed, and the performance of the composite anode material is confirmed by observing the secondary battery manufactured by applying the same to the anode.

EXAMPLE 1

A composite anode material was manufactured using a carbon fiber obtained through electrospinning and 325-mesh-sized silicon microparticles. As the 325-mesh-sized silicon microparticles, a commercially available product was used, and was composed of particles smaller than 42 μm, and was thus on a micro-scale. The carbon fiber dip-coated with ethanol, in which 5% silicon microparticles were dispersed, was subjected to carbothermal shock by applying a current of 53 A at a voltage of 120 V for 1 sec.

Figure 3:
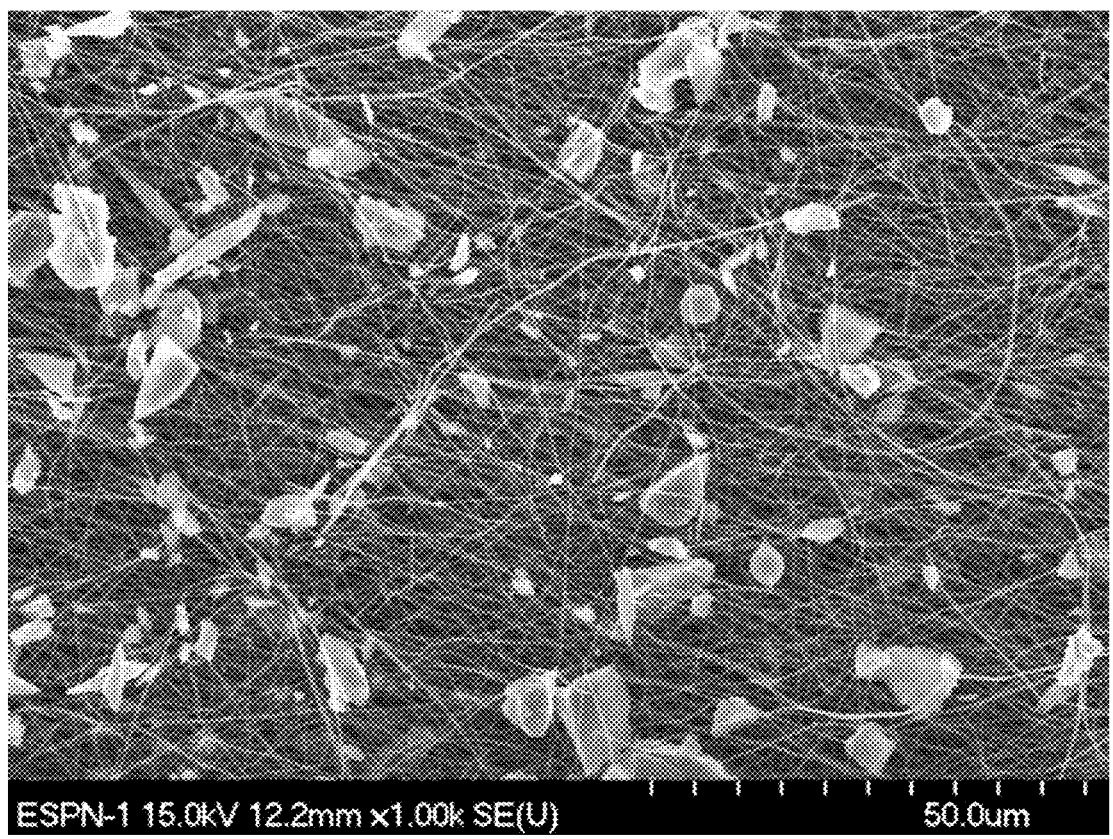
FIG. 3 is an image showing the simple mixture of carbon fiber and silicon microparticles before carbothermal shock.
Figure 4:
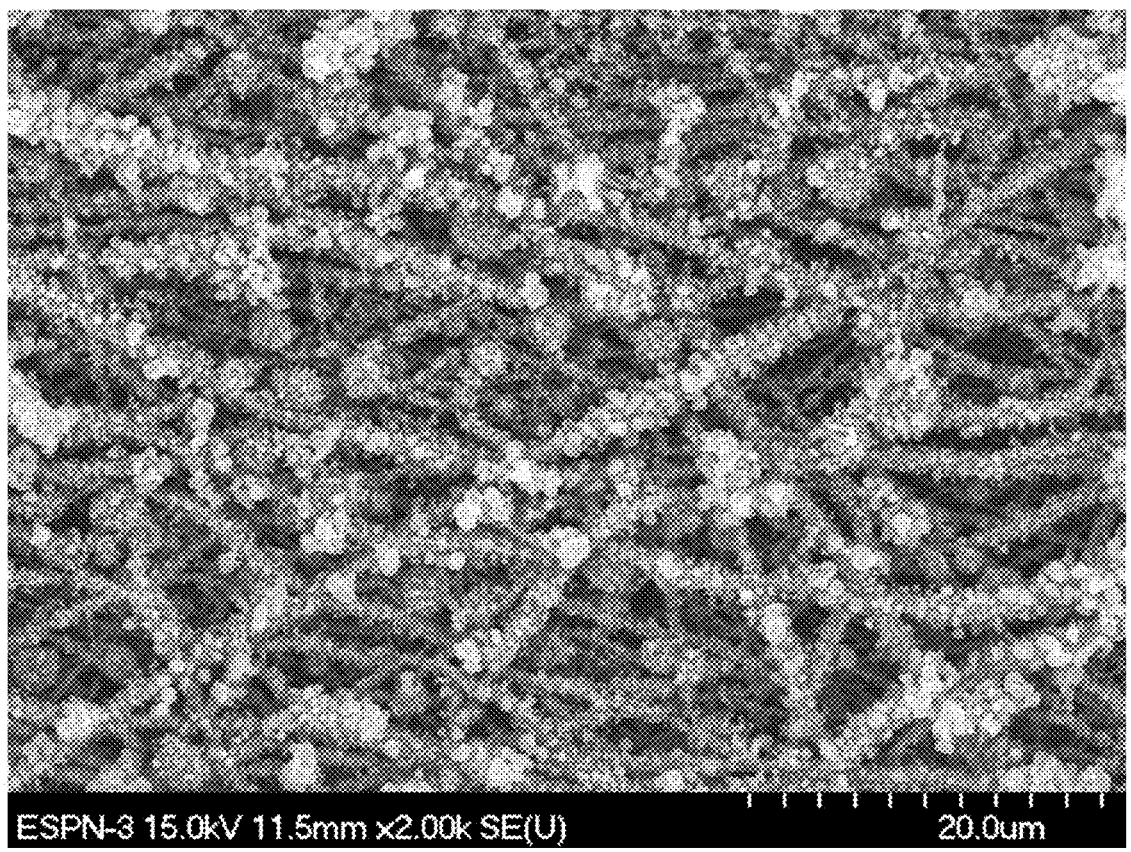
FIG. 4 is an image taken after the application of carbothermal shock.

FIG. 3 is an image showing the simple mixture of electrospun carbon fiber and silicon microparticles before carbothermal shock, and FIG. 4 is an image taken after the application of carbothermal shock.

Before carbothermal shock, the electrospun carbon fiber was simply mixed with silicon microparticles.

After carbothermal shock, however, silicon was melted and attached in the form of particles to the surface of the carbon fiber. Here, it can be confirmed that the silicon particles attached to the carbon fiber showed a shape close to a spherical shape, and thus silicon was confirmed to be melted, spheroidized, and attached to the surface of the carbon fiber during the carbothermal shock.

EXAMPLE 2

A composite anode material was manufactured using an exfoliated graphite sheet and 325-mesh-sized silicon microparticles. The exfoliated graphite sheet was dip-coated with a phenol resin in which 6% silicon microparticles were dispersed, dried in an ambient atmosphere for 24 hr, stabilized to 350° C. in a nitrogen atmosphere so that residual carbon was left behind as a solid component, and then subjected to carbothermal shock by applying a current of 95 A at a voltage of 220 V for 30 sec. In order to sufficiently transfer the thermal energy of the rapidly heated graphite sheet to the silicon particles, the silicon particles were brought into contact with the graphite sheet in the state in which residual carbon was left behind as a solid component.

Figure 5:
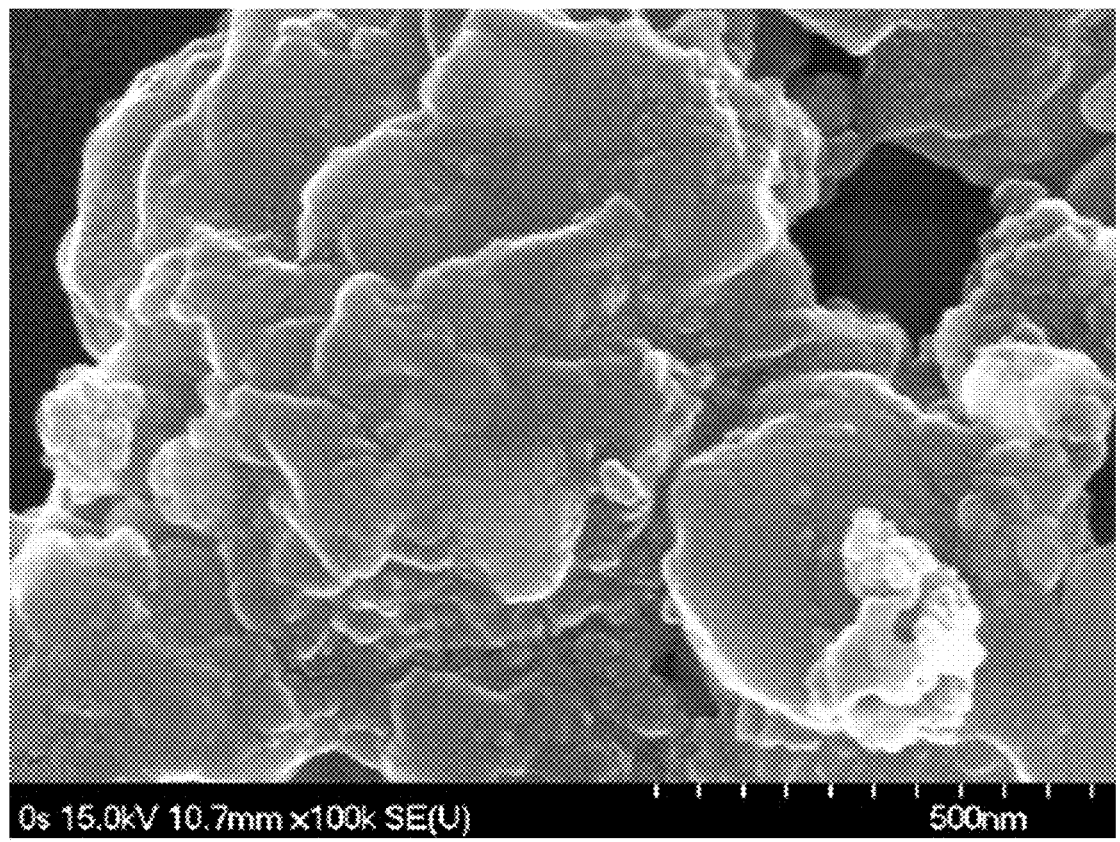
FIG. 5 is an image showing the simple mixture of an exfoliated graphite sheet and silicon microparticles before carbothermal shock.
Figure 6:
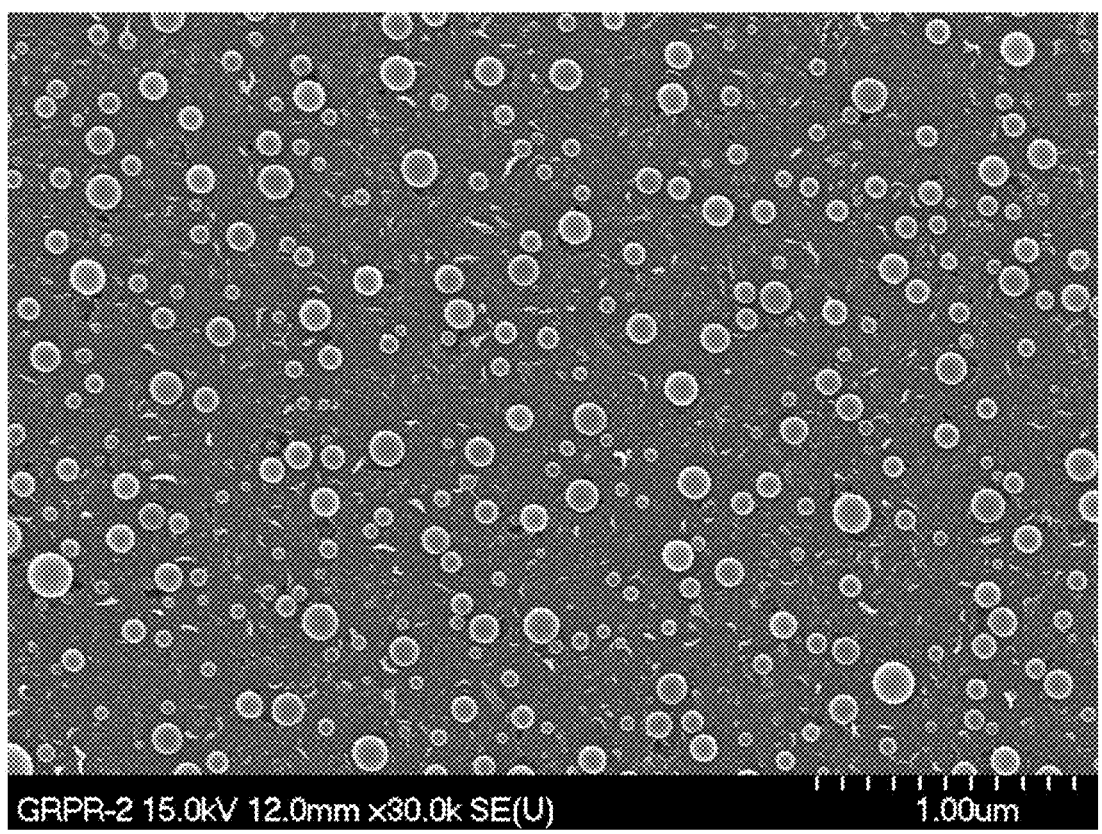
FIG. 6 is an image showing the surface of the exfoliated graphite sheet after carbothermal shock.

FIG. 5 is an image showing the simple mixture of the exfoliated graphite sheet and the silicon microparticles before carbothermal shock, and FIG. 6 is an image showing the surface of the exfoliated graphite sheet after carbothermal shock.

Before carbothermal shock, the exfoliated graphite sheet and the silicon microparticles were simply mixed.

After carbothermal shock, however, spherical silicon particles were uniformly dispersed and attached to the surface of the exfoliated graphite sheet. As described above, during carbothermal shock, micro-sized silicon was melted, spheroidized, and attached to the surface of the exfoliated graphite sheet. In particular, it can be found that it is possible to manufacture a composite anode material configured such that the nano-sized silicon particles are uniformly dispersed even without additional processing for dispersion due to high enough power for the thermal shock from carbonaceous material or primary attachment to pores formed in the surface of the carbon.

Figure 7:
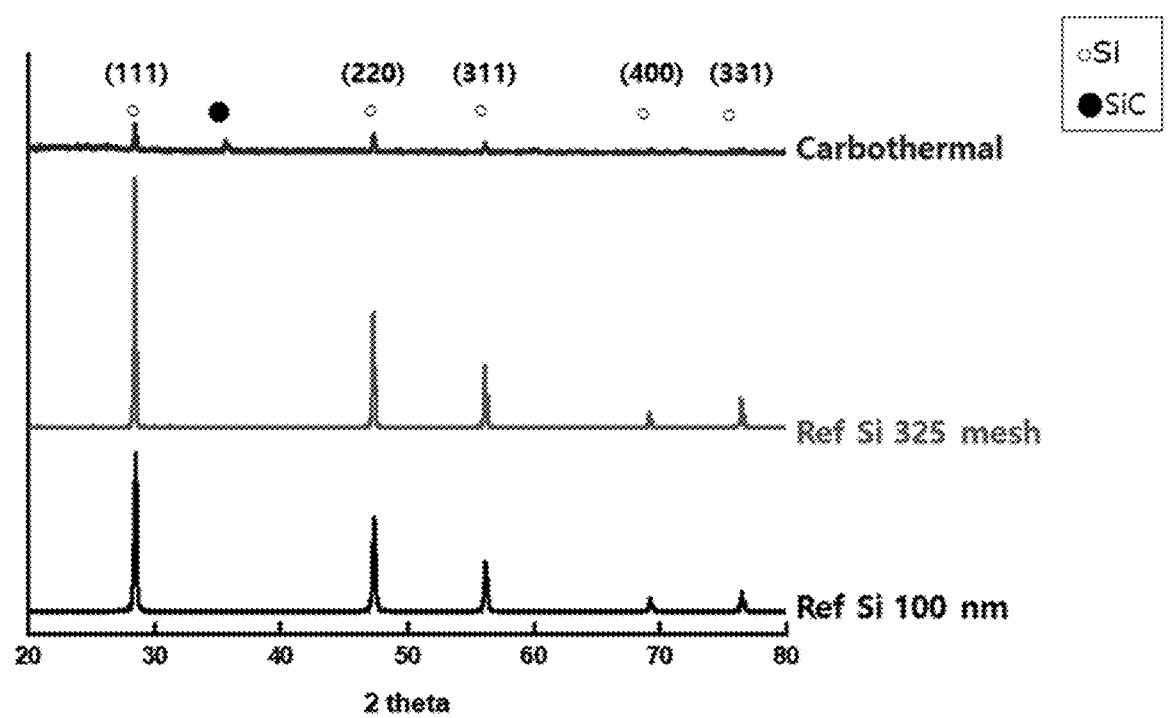
FIG. 7 shows the results of X-ray diffraction (XRD) analysis of a composite anode material manufactured using an exfoliated graphite sheet and silicon microparticles.

FIG. 7 shows the results of XRD analysis of the composite anode material manufactured using the exfoliated graphite sheet and the silicon microparticles.

When comparing the XRD results of silicon nanoparticles having an average particle size of 100 nm with the XRD results of 325-mesh-sized silicon microparticles, in the composite anode material manufactured through carbothermal shock according to the present embodiment, only a very weak SiC peak was observed, and silicon peaks appeared in most cases, indicating that the material attached to the surface of exfoliated graphite was silicon.

Figure 8:
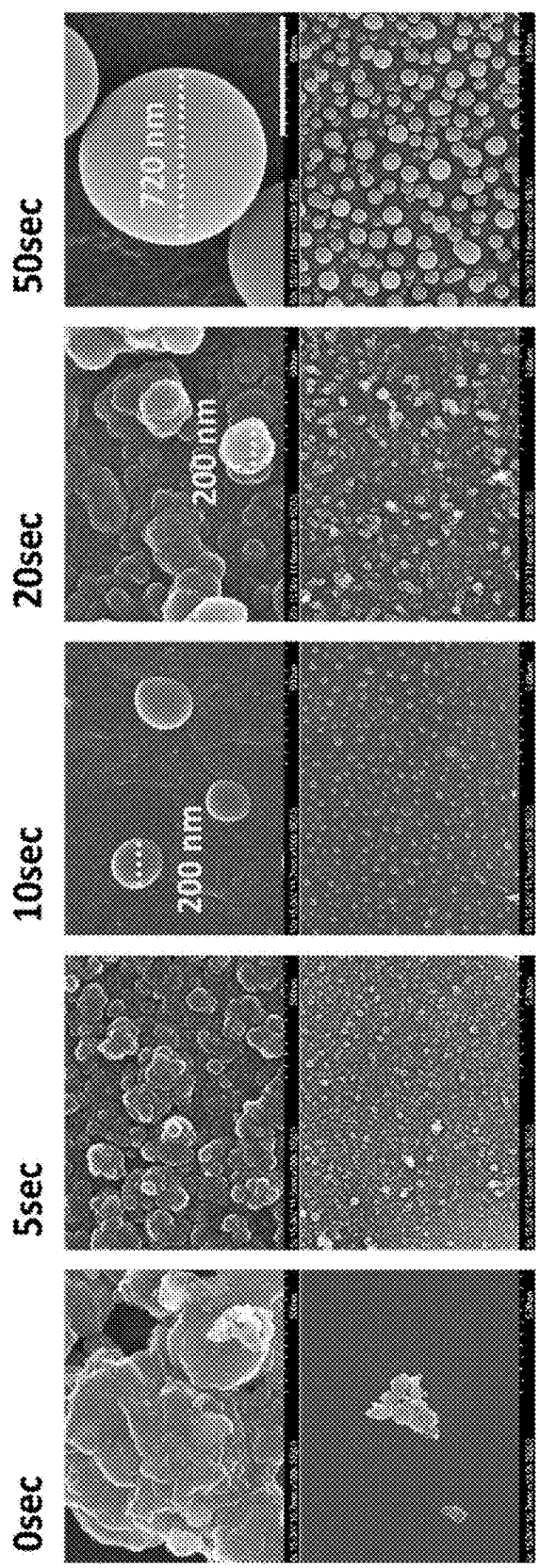
FIG. 8 is images showing the results of carbothermal shock over time during the manufacture of the composite anode material using an exfoliated graphite sheet and silicon microparticles.

FIG. 8 shows the results of carbothermal shock over time during the manufacture of the composite anode material using the exfoliated graphite sheet and the silicon microparticles.

In the above manufacturing process, the time for which the carbothermal shock was applied at a voltage of 220 V was varied. The silicon melted by carbothermal shock was dispersed and attached in the form of particles to the surface of the exfoliated graphite sheet. As the carbothermal shock time increased, the size of the silicon attached to the surface of the exfoliated graphite sheet increased.

If the carbothermal shock time is too long, the size of silicon that is attached is excessively increased, resulting in no effect of silicon miniaturization. Hence, the conditions and time for carbothermal shock need to be appropriately adjusted.

Here, a cooling process may be further performed so as to prevent the attached silicon particles from growing due to the heat remaining in the carbon material.

EXAMPLE 3

A composite anode material was manufactured using natural graphite and 325-mesh-sized silicon microparticles.

The natural graphite and the silicon microparticles were mixed at a weight ratio of 8:2, pressed, and subjected to carbothermal shock by applying a current of 57 A at a voltage of 150 V for 10 sec.

Figure 9:
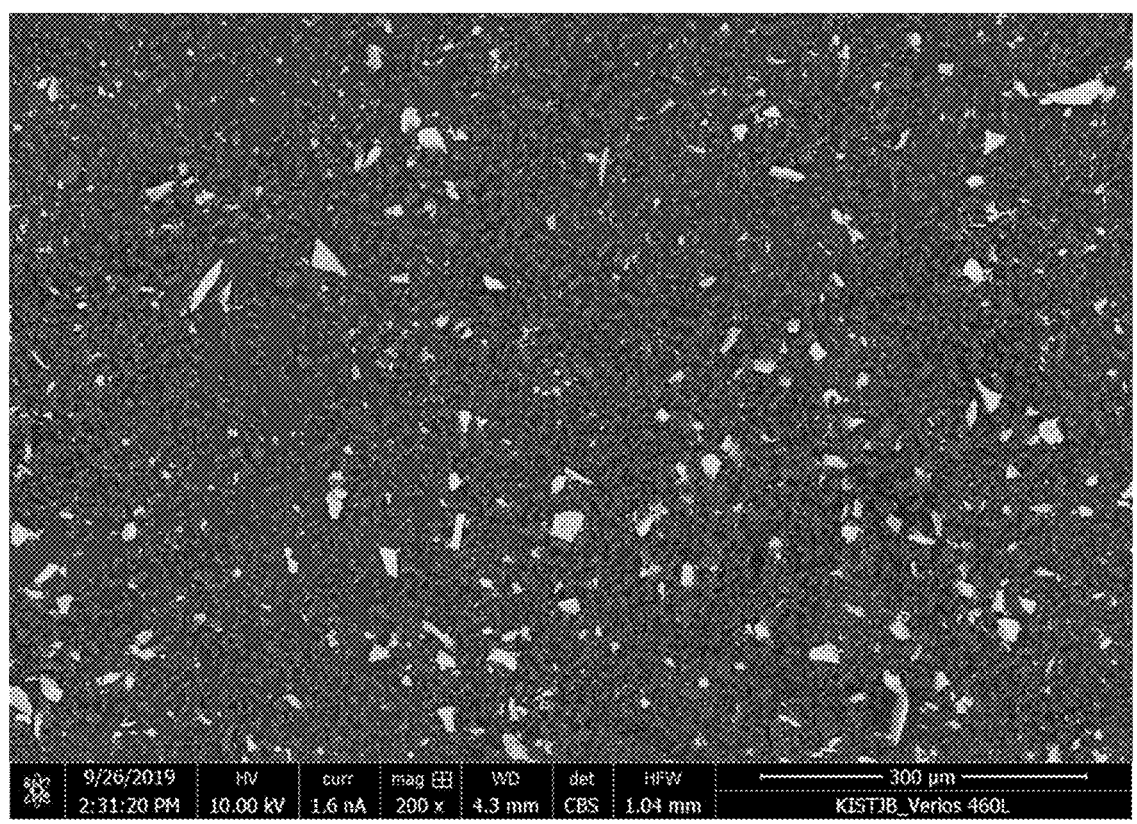
FIG. 9 is an image showing the result of pressing of the mixture of natural graphite and silicon microparticles before carbothermal shock.
Figure 10:
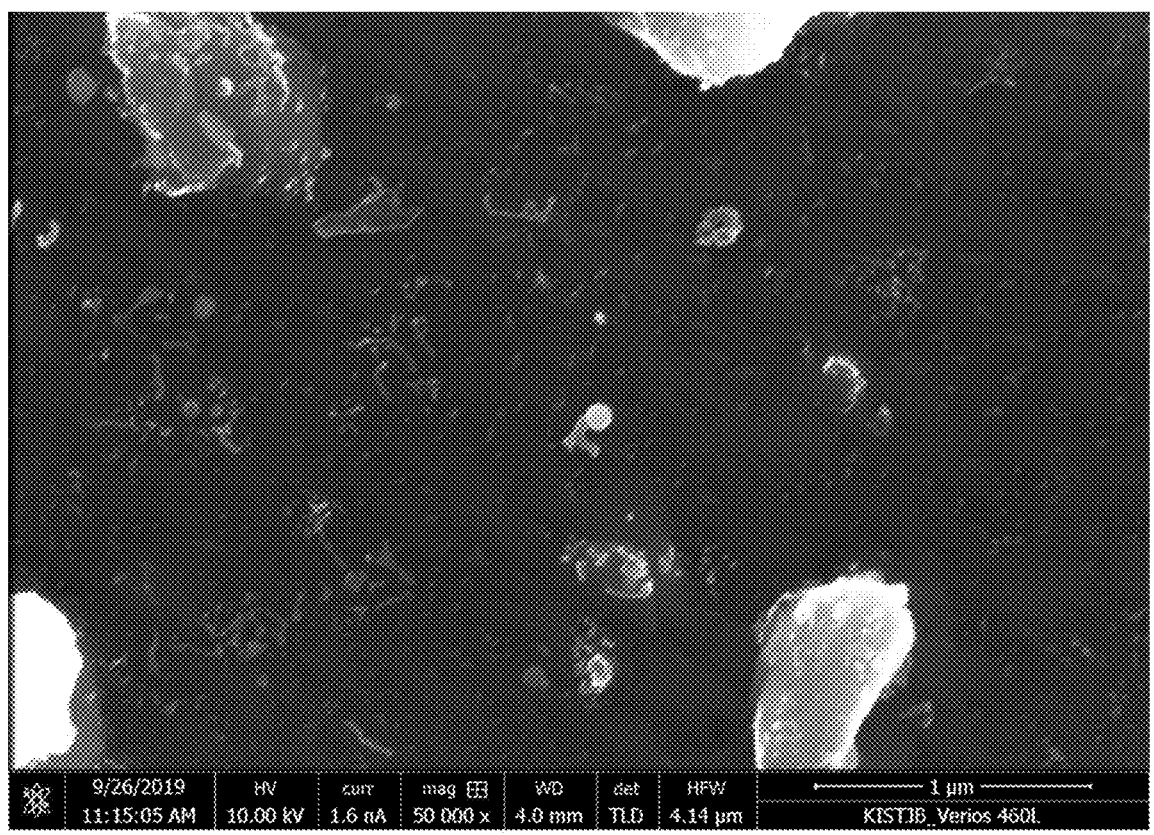
FIG. 10 is an image showing the surface of natural graphite after carbothermal shock.

FIG. 9 is an image showing the result of pressing of the mixture of natural graphite and silicon microparticles before carbothermal shock, and FIG. 10 is an image showing the surface of natural graphite after carbothermal shock.

It can be confirmed that, although all of the silicon microparticles mixed with natural graphite were not melted, some of the silicon particles were attached in the form of particles to the surface of the natural graphite after melting through carbothermal shock.

EXAMPLE 4

A composite anode material was manufactured using natural graphite and 325-mesh-sized silicon microparticles in the same manner as in Example 3, with the exception that the natural graphite and the silicon microparticles were mixed at a weight ratio of 7:3.

Figure 11:
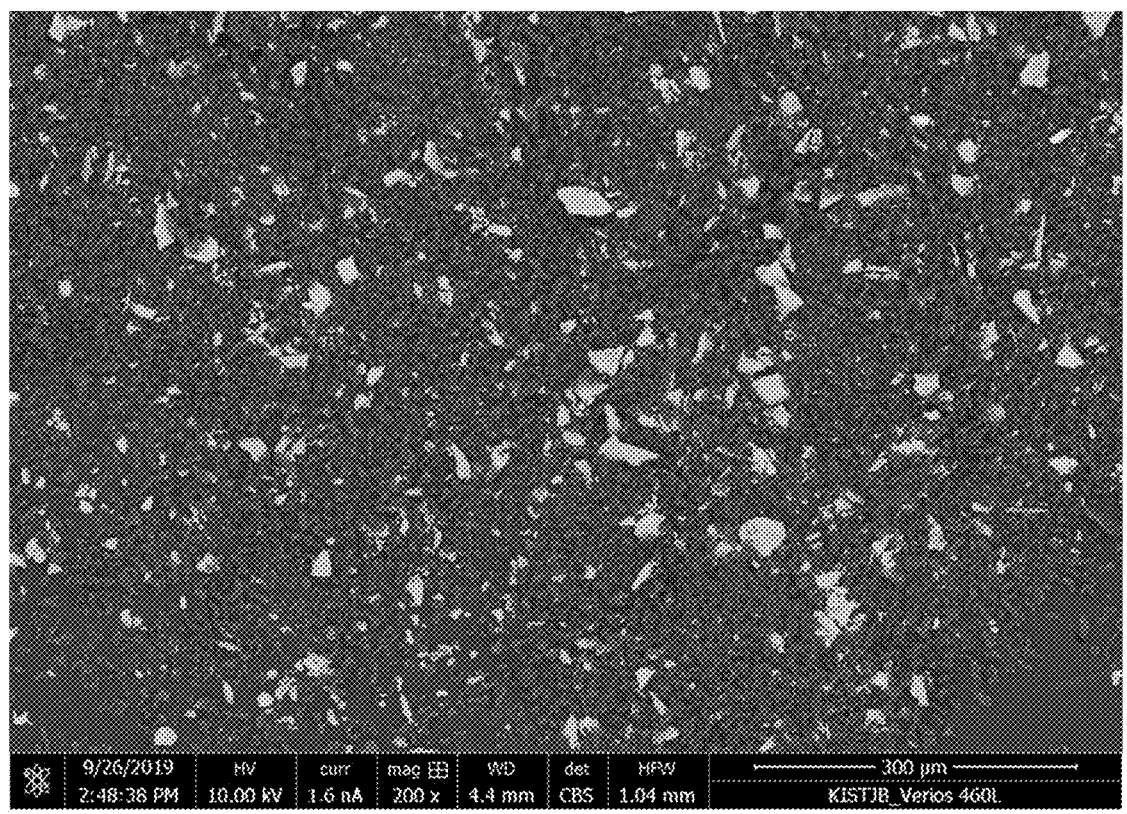
FIG. 11 is an image showing the result of pressing of the mixture of natural graphite and silicon microparticles before carbothermal shock.
Figure 12:
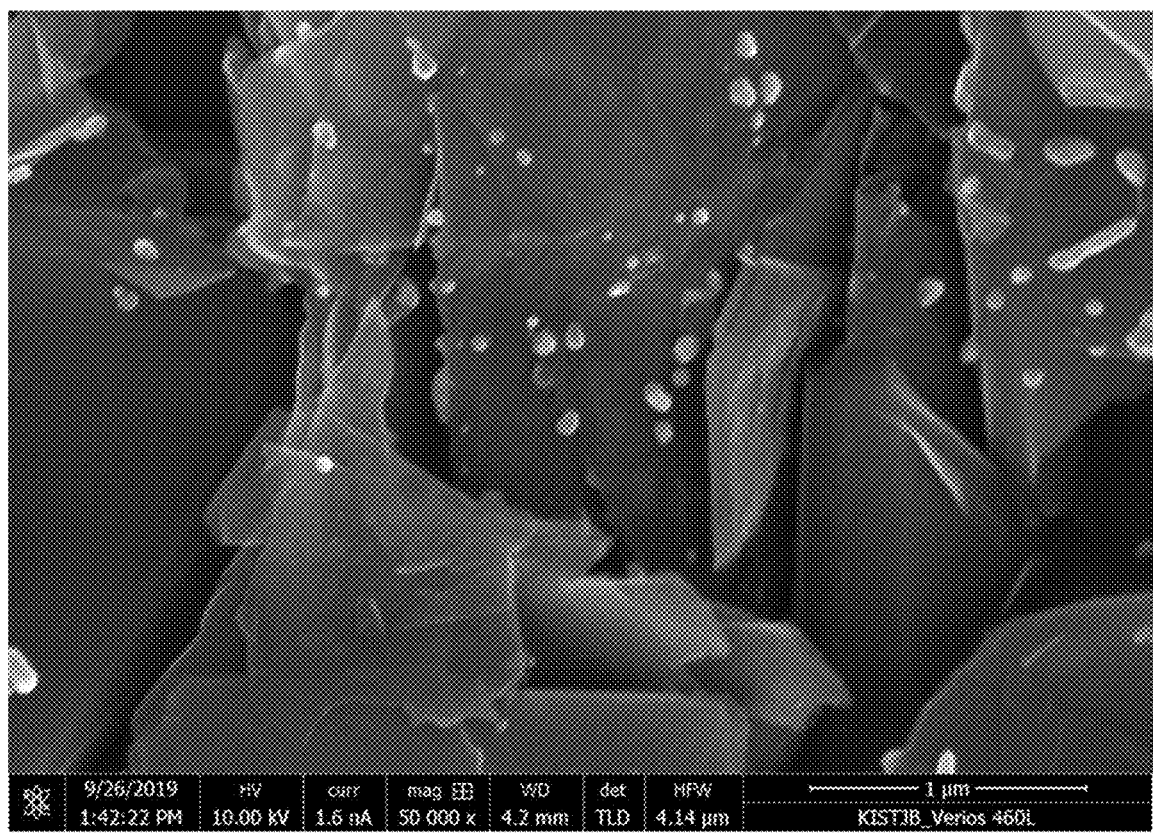
FIG. 12 is an image showing the surface of natural graphite after carbothermal shock.

FIG. 11 is an image showing the result of pressing of the mixture of natural graphite and silicon microparticles before carbothermal shock, and FIG. 12 is an image showing the surface of natural graphite after carbothermal shock.

It can be confirmed that many bright silicon microparticles were observed compared to Example 3 and also that the amount of the silicon particles attached to the surface of natural graphite was increased through carbothermal shock.

A secondary battery was manufactured using the composite anode material of each of Examples 1 to 4.

An electrode was manufactured by mixing 80 wt % of the composite anode material manufactured above as an active material, 10 wt % of a conductor and 10 wt % of a binder. Then, a lithium secondary battery coin cell was manufactured using an electrolyte comprising ethylene carbonate (EC) and dimethyl carbonate (DMC) at a volume ratio of 1:1 in lithium hexafluorophosphate ($LiPF_6$).

The coin cell thus manufactured was subjected to charging and discharging under conditions of a current of 100 mAh/g and a voltage of 0.005 V to 2.0 V.

Figure 13:
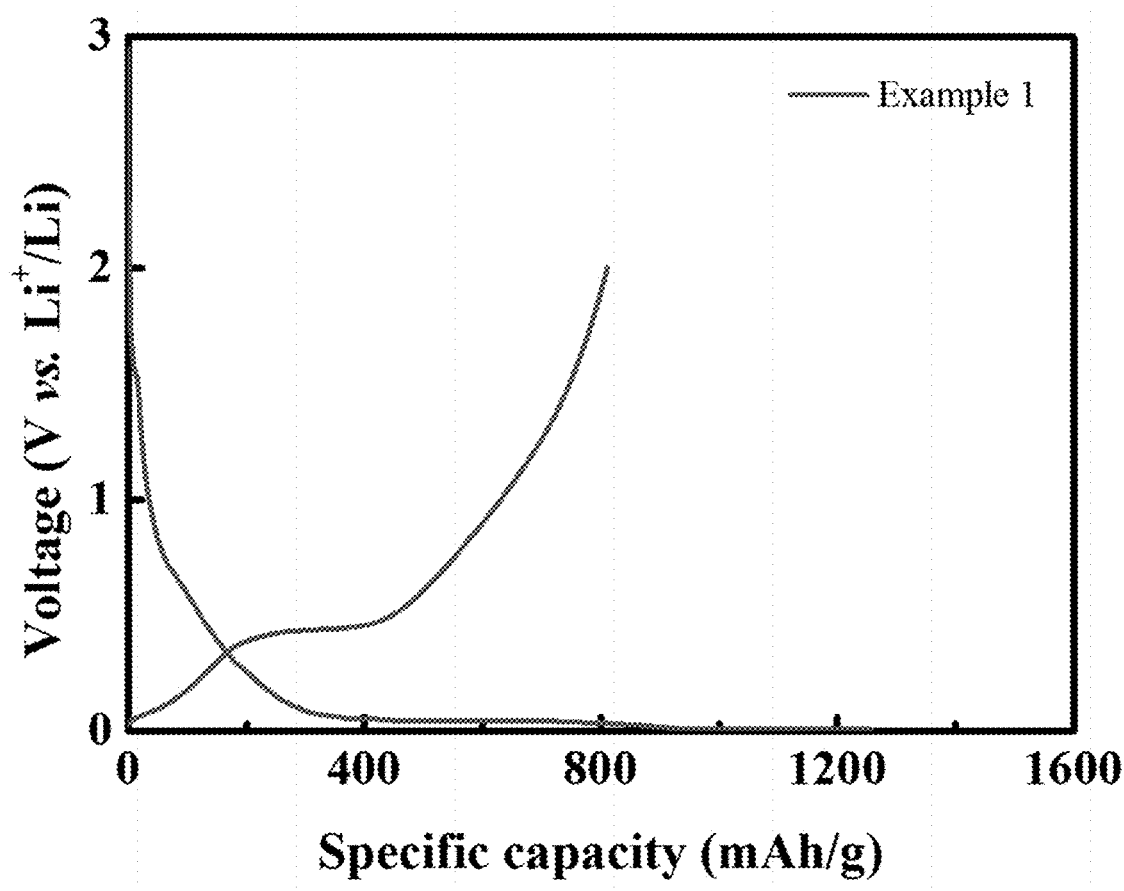
FIGS. 13 to 15 show the results of charging and discharging of secondary batteries manufactured using the composite anode materials of Examples 1 to 4.
Figure 14:
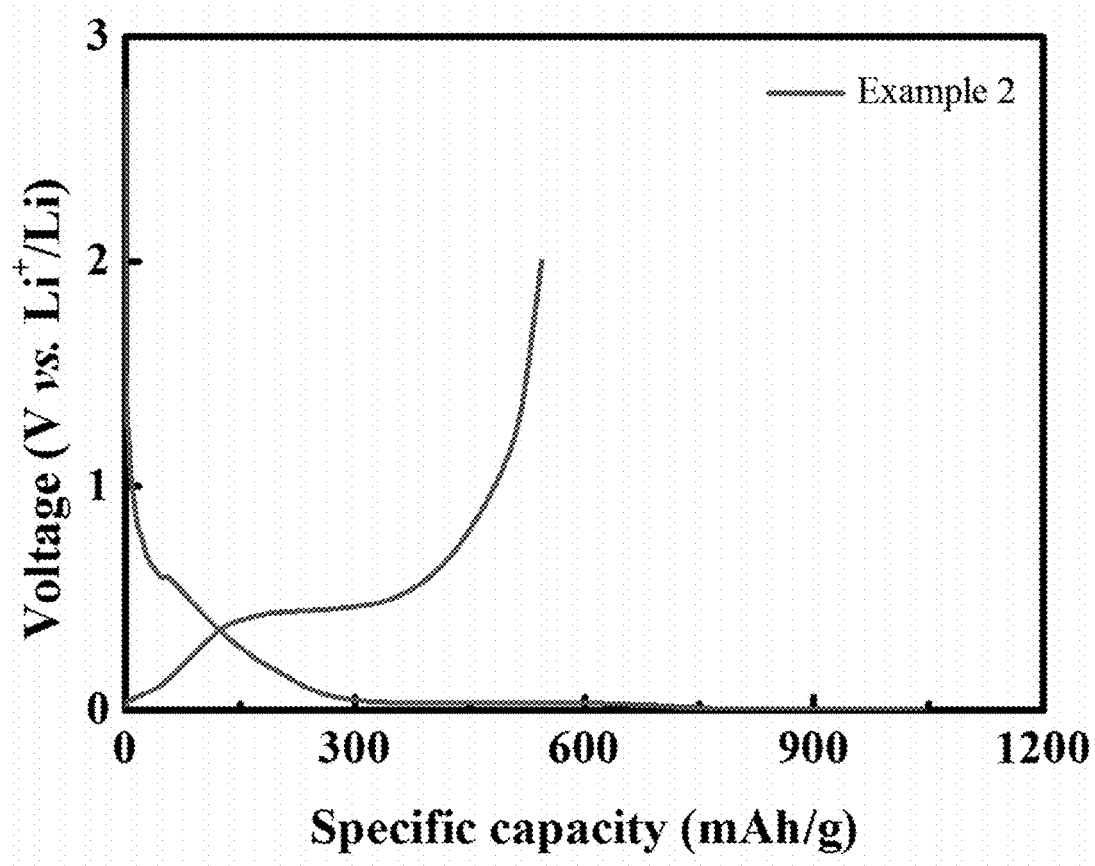
Figure 15:
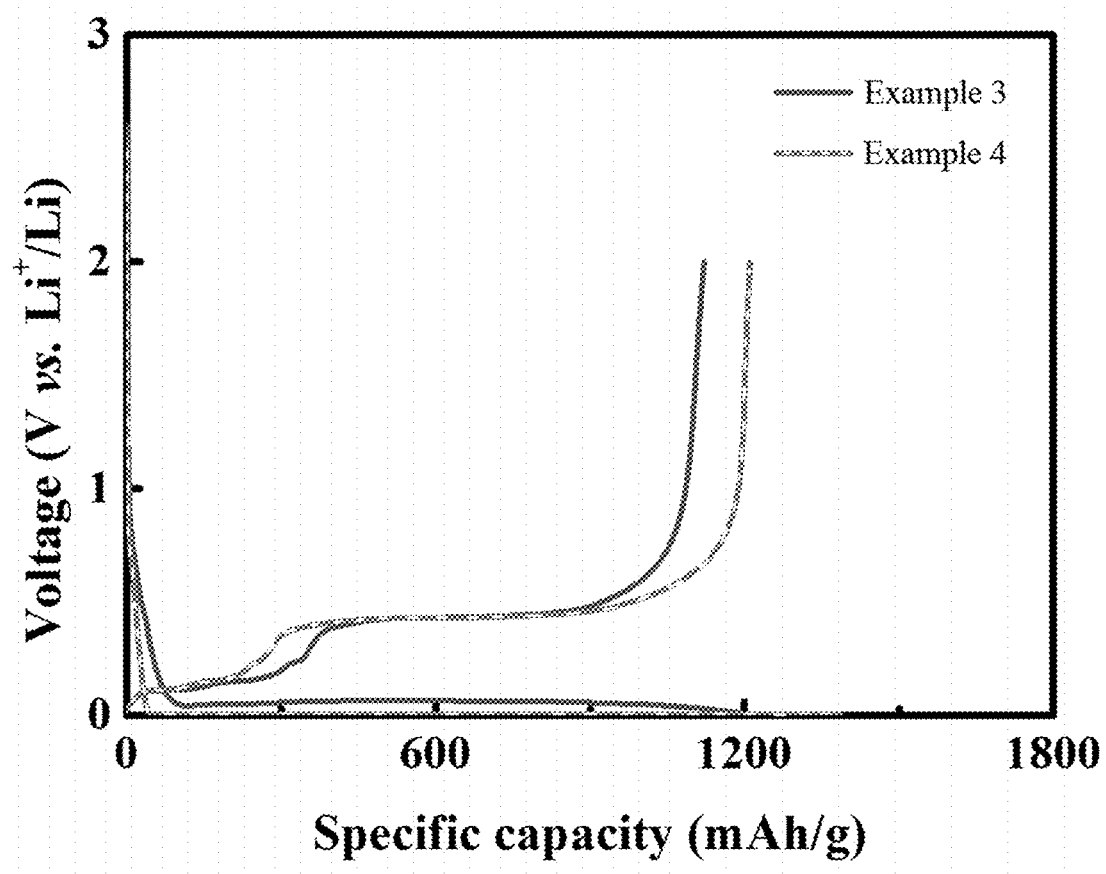

FIGS. 13 to 15 show the results of charging and discharging of the secondary batteries manufactured using the composite anode materials of Examples 1 to 4.

As Comparative Examples, coin cells were manufactured under the same conditions using the following active materials. Specifically, commercially available silicon nanoparticles having a particle size of 100 nm (Comparative Example 1), 325-mesh-sized commercially available silicon microparticles used to manufacture the composite anode material (Comparative Example 2), an exfoliated graphite sheet (Comparative Example 3) and natural graphite (Comparative Example 4) were used as the active materials.

The results of charging and discharging of the secondary batteries manufactured using the composite anode materials of Examples 1 to 4 and the secondary batteries manufactured using the active materials of Comparative Examples 1 to 4 are shown in Table 1 below.

TABLE 1

|  | Charge capacity (mAh/g) | Discharge capacity (mAh/g) | Coulombic efficiency (%) |
| --- | --- | --- | --- |
| Example 1 | 1256 | 811 | 64.6 |
| Example 2 | 1044 | 544 | 52.2 |
| Example 3 | 1339 | 1122 | 83.7 |
| Example 4 | 1385 | 1211 | 87.4 |
| Comparative Example 1 | 4014 | 3535 | 88.1 |
| Comparative Example 2 | 3786 | 1722 | 45.5 |
| Comparative Example 3 | 510 | 367 | 72.0 |
| Comparative Example 4 | 755 | 529 | 70.0 |

In Comparative Examples 1 and 2 using silicon alone, charge capacity and discharge capacity were relatively large. When using silicon nanoparticles having a size of 100 nm, both the initial charge capacity and discharge capacity were high due to the small particle size, and moreover, high efficiency resulted, but the case of 325-mesh-sized silicon microparticles exhibited relatively low discharge capacity and very low efficiency. The results of Comparative Examples 1 and 2 indicate initial performance typical properties of silicon. However, as is generally known, the price of silicon nanoparticles having a size of 100 nm is very high, and a short life may result from mechanical damage to silicon due to volume expansion and contraction upon charging and discharging.

In Comparative Examples 3 and 4 using graphite materials, charge capacity and discharge capacity were relatively small but the efficiency was high compared to Comparative Example 2 using the 325-mesh-sized silicon microparticles.

The composite anode materials of Examples 1 to 4 using carbon and silicon exhibited high charge capacity and discharge capacity compared to Comparative Examples 3 and 4. In particular, in Examples 3 and 4, both capacity and efficiency were greatly increased compared to Comparative Example 4 using natural graphite. Meanwhile, in Examples 1 and 2, the characteristic form of the carbon fiber and the exfoliated graphite sheet was not optimized, and thus the measured efficiency was slightly low, but the capacity was increased by virtue of the compounding of the carbon material and the nano-sized silicon attached to the surface thereof.

As the carbonaceous material, carbon nanotubes may be used. In the case of carbon nanotubes, attention must be paid to dispersion so that attachment of silicon by carbothermal shock proceeds uniformly. Alternatively, a mixture of various carbonaceous materials may be applied.

As described hereinbefore, the present invention is capable of manufacturing a composite anode material configured such that nano-sized silicon is attached to the surface of the carbon material using silicon particles on a microscale through carbothermal shock. Taking into consideration that the price of silicon particles manufactured at the nano size is very high, a composite anode material in which fine silicon is attached to the surface of the carbon material so as to enable rapid charging and discharging can be manufactured at relatively low cost. Moreover, silicon melted by carbothermal shock is attached to the surface of the carbon material to form a composite material, thereby solving durability problems due to changes in volume during charging and discharging.

Although the preferred embodiments of the present invention have been disclosed for illustrative purposes, those skilled in the art will appreciate that various modifications, additions and substitutions are possible, without departing from the technical idea of the present invention. Therefore, the scope of protection of the present invention should be determined by the scope of the appended claims, rather than the specific embodiments, and all technical ideas falling within the scope of the claims should be construed as being included in the scope of the present invention.

What is claimed is:

1. A method of manufacturing a composite anode material, the method comprising:
    a preparation step of mixing a carbonaceous material and solid silicon as raw materials at a weight ratio of 8:2 or 7:3, wherein the solid silicon includes silicon microparticles composed of particles smaller than 42 μm; and
    a carbothermal shock step of heating the carbonaceous material so that the solid silicon is melted using the heated carbonaceous material and is dispersed and attached in a form of particles to a surface of the carbonaceous material,
    wherein, in the carbothermal shock step, a size of silicon particles, which are attached to the surface of the carbonaceous material and grow, is adjusted by controlling the conditions and time of the carbothermal shock,
    wherein, in the carbothermal shock step, the carbonaceous material is heated to 1400° C. or higher within 10 sec, and,
    wherein the carbothermal shock step is controlled such that a diameter of the silicon particles attached to the surface of the carbonaceous material is 100 nm or less.

2. The method of claim 1, wherein the carbonaceous material is at least one selected from among graphite, graphene oxide, carbon nanotubes, and a carbon fiber.

3. The method of claim 1, wherein the carbonaceous material is graphite, and the preparation step is performed by subjecting the graphite and the silicon microparticles to mixing and then pressing.

4. The method of claim 1, wherein the carbonaceous material is an exfoliated graphite sheet, and the preparation step is performed by dip-coating the exfoliated graphite sheet with a liquid in which silicon particles are dispersed.

5. The method of claim 1, wherein the carbonaceous material is a carbon fiber, and the preparation step is performed by dip-coating the carbon fiber with a liquid in which silicon particles are dispersed.

6. The method of claim 1, wherein, after the carbothermal shock step, a cooling step is performed so as to prevent the silicon particles attached to the surface of the carbonaceous material from growing due to thermal energy remaining in the carbonaceous material.

7. The method of claim 1, wherein, after the carbothermal shock step, the carbonaceous material having the silicon particles attached to the surface thereof is pulverized, coated with a carbon precursor and manufactured into a spherical shape having a diameter of 15 to 20 μm.

* * * * *